US008683327B2

(12) United States Patent
Metso et al.

(10) Patent No.: US 8,683,327 B2
(45) Date of Patent: Mar. 25, 2014

(54) FREQUENCY CONVERTER WITH TEXT EDITOR

(75) Inventors: Vesa Metso, Helsinki (FI); Lauri Sumari, Espoo (FI); Marjukka Mäkelä, Helsinki (FI)

(73) Assignee: ABB Oy, Helsinki (FI)

( * ) Notice: Subject to any disclaimer, the term of this patent is extended or adjusted under 35 U.S.C. 154(b) by 184 days.

(21) Appl. No.: 13/234,618

(22) Filed: Sep. 16, 2011

(65) Prior Publication Data

US 2012/0072868 A1 Mar. 22, 2012

(30) Foreign Application Priority Data

Sep. 16, 2010 (EP) ..................................... 10177110

(51) Int. Cl.
*G06F 17/00* (2006.01)

(52) U.S. Cl.
USPC .......................................... 715/255; 715/864

(58) Field of Classification Search
USPC ........................... 715/200, 256, 273, 255, 864
See application file for complete search history.

(56) References Cited

U.S. PATENT DOCUMENTS

| | | | | |
|---|---|---|---|---|
| 5,379,030 A * | 1/1995 | Nolan et al. ................. | 340/7.25 |
| 5,790,115 A | 8/1998 | Pleyer et al. | |
| 5,870,107 A * | 2/1999 | Fujisawa et al. .............. | 345/467 |
| 6,616,703 B1 * | 9/2003 | Nakagawa ..................... | 715/201 |
| 6,744,423 B2 * | 6/2004 | Kraft et al. .................... | 345/169 |
| 6,760,012 B1 * | 7/2004 | Laurila ......................... | 345/169 |
| 6,763,226 B1 * | 7/2004 | McZeal, Jr. ................. | 455/90.2 |
| 6,822,585 B1 * | 11/2004 | Ni et al. .......................... | 341/28 |
| 6,848,080 B1 * | 1/2005 | Lee et al. ...................... | 715/203 |
| 7,654,902 B2 * | 2/2010 | Matsuno et al. ................ | 463/42 |
| 2002/0054135 A1 * | 5/2002 | Noguchi et al. .............. | 345/788 |
| 2002/0060699 A1 | 5/2002 | D'Agostini | |
| 2002/0089435 A1 | 7/2002 | Hanamoto et al. | |
| 2005/0140653 A1 * | 6/2005 | Pletikosa et al. .............. | 345/168 |

(Continued)

FOREIGN PATENT DOCUMENTS

DE           101 47 937 A1     4/2003
DE   10 2007 039 165 A1     1/2009

(Continued)

OTHER PUBLICATIONS

Search Report issued on Feb. 8, 2011, by European Patent Office for Application No. 10177110.

*Primary Examiner* — Cong-Lac Huynh
(74) *Attorney, Agent, or Firm* — Buchanan Ingersoll & Rooney PC

(57) ABSTRACT

A frequency converter includes a symbol string editor in which the potential input symbols are grouped into at least two symbol lists. One of the lists is treated as a current symbol list, which can be scrolled and from which the symbols can be selected as the user input. In addition, a user is allowed to control change of the current symbol list such that the symbols in all of the symbol lists are available for selection. This arrangement allows for scrollable lists to be significantly shorter than a single list of potential symbols would be, which makes entering symbol strings faster.

21 Claims, 5 Drawing Sheets

(56) References Cited

U.S. PATENT DOCUMENTS

| | | | |
|---|---|---|---|
| 2005/0195537 A1* | 9/2005 | Virolainen | 361/18 |
| 2006/0236239 A1* | 10/2006 | Simpson et al. | 715/531 |
| 2007/0156929 A1* | 7/2007 | Lian et al. | 710/8 |
| 2009/0112930 A1* | 4/2009 | Anguiano | 707/104.1 |
| 2010/0039445 A1* | 2/2010 | Kangas | 345/619 |
| 2011/0175820 A1* | 7/2011 | Toba | 345/169 |
| 2012/0191796 A1* | 7/2012 | Griffin et al. | 709/206 |
| 2012/0206382 A1* | 8/2012 | Kusano | 345/173 |

FOREIGN PATENT DOCUMENTS

| | | |
|---|---|---|
| DE | 10 2007 039 188 A1 | 1/2009 |
| DE | 10 2008 005 880 A1 | 7/2009 |
| EP | 0 443 585 A2 | 8/1991 |
| WO | WO 02/07298 A1 | 1/2002 |

* cited by examiner

FREQUENCY CONVERTER WITH TEXT EDITOR

RELATED APPLICATION

This application claims priority under 35 U.S.C. §119 to Finnish Patent Application No. 10177110.3 filed in Finland on Sep. 16, 2010, the entire content of which is hereby incorporated by reference in its entirety.

FIELD

The present disclosure relates to frequency converters including a control panel with a text editing function.

BACKGROUND INFORMATION

Frequency converters often have a small control panel with a limited number of keys and a small display. These are used to input certain user definable parameters and to show, for example, the status of the frequency converter.

The desire to keep the size of the display small and to limit the number of the keys, for example, for reasons of reliability, simplicity and compactness, imposes limits for the user interface available to input symbol strings, such as editing texts. A text editor is, however, useful for naming the controlled devices, for instance. After all, the control panel should be robust and suitable for heavy professional use.

The control panels and text editing functions of power electronic apparatuses are presented in DE 102008005880 A1 (SIEMENS AG), DE 102007039188 A1 (SIEMENS AG), DE 102007039165 A1 (SIEMENS AG), WO 0207298 A1 (YASKAWA DENKI) and EP 0443585 A2 (MITSUBISHI ELECTRIC CORP).

Of the above documents, WO 0207298 A1 discloses a method for enhancing the operability by decreasing the number of operations required for altering the setting of parameters of an inverter. The parameter number of each parameter of an inverter includes a rough function number A1, A2, B1, . . . , and a detailed function number 00, 01, 02, . . . which can be altered independently. When the set value of a parameter of the inverter is altered, a rough function of that parameter is selected at first using the rough function number, and a parameter is retrieved roughly. Subsequently, a detailed function is retrieved and indicated, and the set value of the parameter is altered. A parameter having a set value to be altered can thereby be indicated with a small number of operations.

The above document does not, however, provide a technique of inputting symbol strings, such as text strings.

One possibility for editing and inputting symbol strings is to provide a scrollable symbol list, from which the input symbols can be selected one by one. This solution is very intuitive and easy to use, but it is not practical in case there is a desire to use a great number of potential symbols. This is because then the symbol list is very long and it is tiresome and time-consuming to scroll through the list to select the desired input symbols.

SUMMARY

An exemplary embodiment of the present disclosure provides a method for obtaining a symbol string user input via a four-directional control device in a frequency converter. The exemplary method includes grouping potential symbols into at least two symbol lists, treating one of the symbol lists as a current symbol list, and displaying at least part of at least the current symbol list. The exemplary method also includes displaying a cursor indicating a current symbol as one of the symbols in the current symbol list, and receiving commands via the four-directional control device. In addition, based on the received commands, the exemplary method includes selectively changing the current symbol list to one of the other symbol lists, effecting relative movement between the cursor and the current symbol list, and selecting the current symbol as the next symbol in the symbol string.

An exemplary embodiment of the present disclosure provides a frequency converter which includes a data structure including symbols grouped into at least two symbol lists, one of which is a current symbol list. The exemplary frequency converter also includes a display configured to display at least part of at least the current symbol list and a cursor indicating a current symbol as one of the symbols, and a four-directional control device configured to receive commands. In addition, the exemplary frequency converter includes a controller configured to, based on the received commands, selectively effect the change of the current symbol list to one of the other symbol lists, effect relative movement between the cursor and the current symbol list, and select the current symbol as an input.

An exemplary embodiment of the present disclosure provides a frequency converter which includes a data structure including symbols grouped into at least two symbol lists, one of which is a current symbol list, where each of the symbol lists contains a switch lists symbol. The exemplary frequency converter also includes a display configured to display at least part of at least the current symbol list and a cursor indicating a current symbol as one of the symbols, and a four-directional control device configured to receive commands. The four-directional control device is configured to receive commands associated with a first, second, third and fourth directions. In addition, the exemplary frequency converter includes a controller configured to, based on the received commands, selectively effect the change of the current symbol list to one of the other symbol lists, effect relative movement between the cursor and the current symbol list, and select the current symbol as an input. The controller is configured to effect the change of the current symbol list to one of the other symbol lists in response to commands received when the cursor indicates one of the switch lists symbols and associated with at least one of the directions.

An exemplary embodiment of the present disclosure provides a non-transitory computer-readable recording medium having a program recorded thereon that causes a processor of a frequency converter to execute operations including: grouping potential symbols into at least two symbol lists; treating one of the symbol lists as a current symbol list; displaying at least part of at least the current symbol list; displaying a cursor indicating a current symbol as one of the symbols in the current symbol list; receiving commands via the four-directional control device; and based on the received commands, selectively changing the current symbol list to one of the other symbol lists, effecting relative movement between the cursor and the current symbol list, and selecting the current symbol as the next symbol in the symbol string.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a frequency converter with an improved control panel and user interface. For instance, exemplary embodiments of the present disclosure provide a frequency converter having a more advanced symbol string editor.

An exemplary embodiment of the present disclosure provides a frequency converter having a more advanced symbol string editor by grouping the potential input symbols into at least two symbol lists. One of the lists is treated as a current symbol list, which can be scrolled and from which the symbols can be selected as the user input. In addition, a user is allowed to control a change of the current symbol list such that the symbols in all of the symbol lists are available for selection.

Exemplary embodiments of the present disclosure make it possible to construct symbol lists of practical length. The user first selects the appropriate list, and then scrolls the list of a limit number of symbols.

Exemplary embodiments of the present disclosure also provide scrollable lists which are significantly shorter than a single list of potential symbols would be. This makes entering symbol strings faster.

Exemplary embodiments of the present disclosure also provide that the set of available symbols is significantly extended without making the editing process too complicated.

Figure 1:
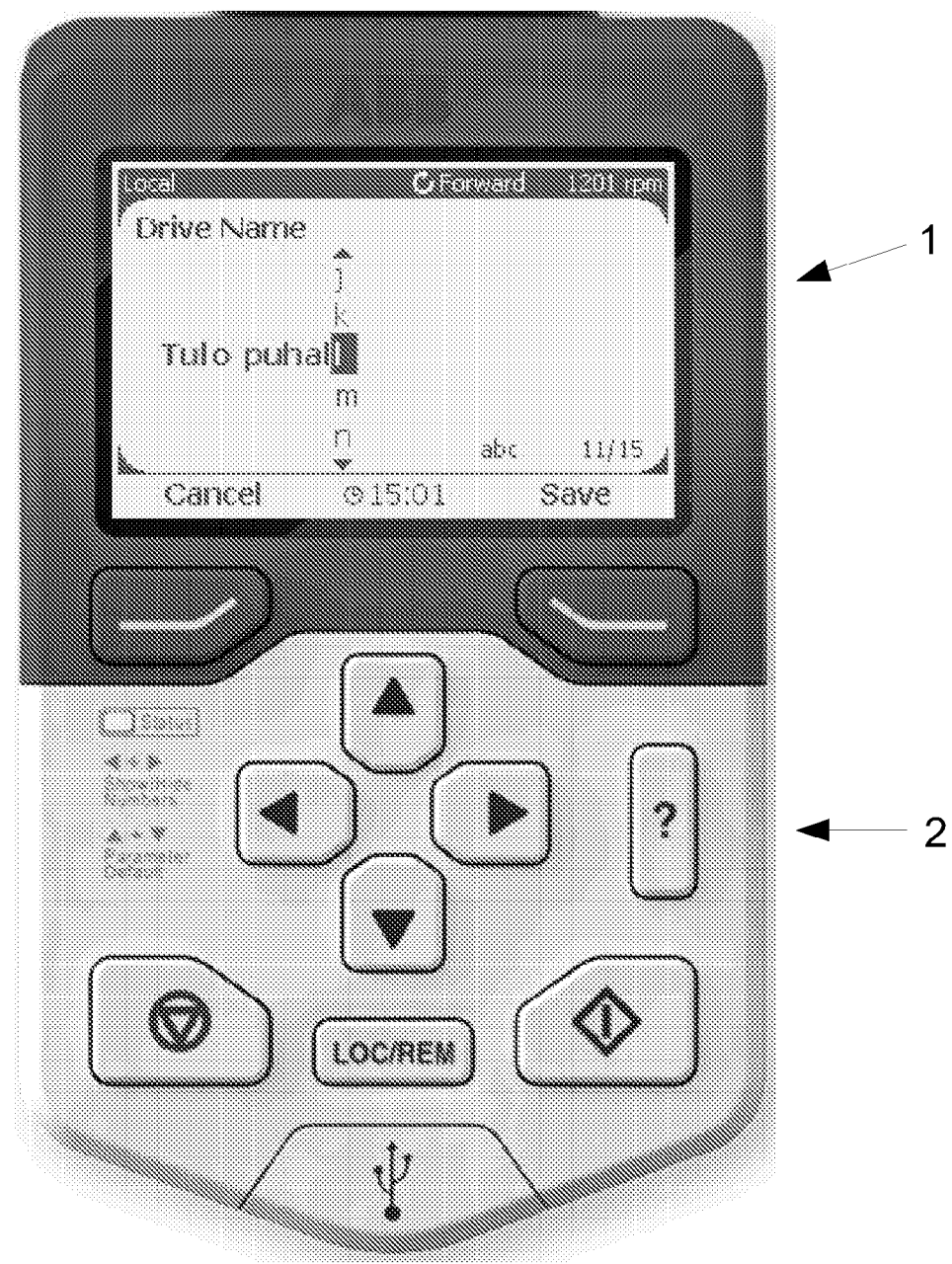
FIG. 1 presents a control panel of a frequency converter according to an exemplary embodiment of the present disclosure.

FIG. 1 presents a control panel of a frequency converter according to an exemplary embodiment of the present disclosure. The control panel includes a display 1 and a set of keys 2. The control panel of FIG. 1 includes ten keys, four of which form part of a four-directional control device. These keys of the four-directional control device are indicated with arrowheads heading respectively in the directions of up, right, down and left in the example of FIG. 1.

Figure 2:
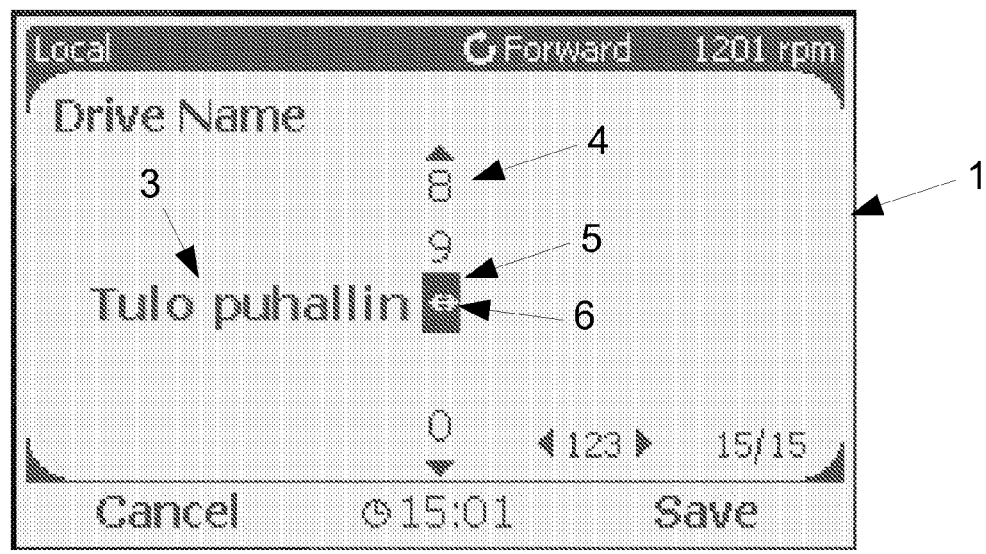
FIG. 2 presents an example of a display window in the frequency converter of FIG. 1.

FIG. 2 shows the display 1 displaying an input symbol string 3 containing symbols that have already been entered by the user. In addition, the display 1 displays a symbol list 4 that can be scrolled in the display 1 such that only a part of the symbol list 4 is visible at any given moment. The displayed symbols include the current symbol that is indicated by a cursor 5 and the symbols adjacent to the current symbol in the symbol list 4. Under the cursor 5, a switch lists symbol 6 is shown. In the illustrated exemplary embodiment of FIG. 2, the switch lists symbol 6 is a horizontal arrow with two arrowheads. According to an exemplary embodiment, in response to the user entering a selection signal by pressing a key, such as the "right" key, and when the cursor 5 indicates the switch lists symbol 6, a set of symbol lists 4 is displayed. According to another exemplary embodiment, the set of symbol lists 4 can always be automatically displayed when the cursor 5 indicates the switch lists symbol 6.

Figure 3:
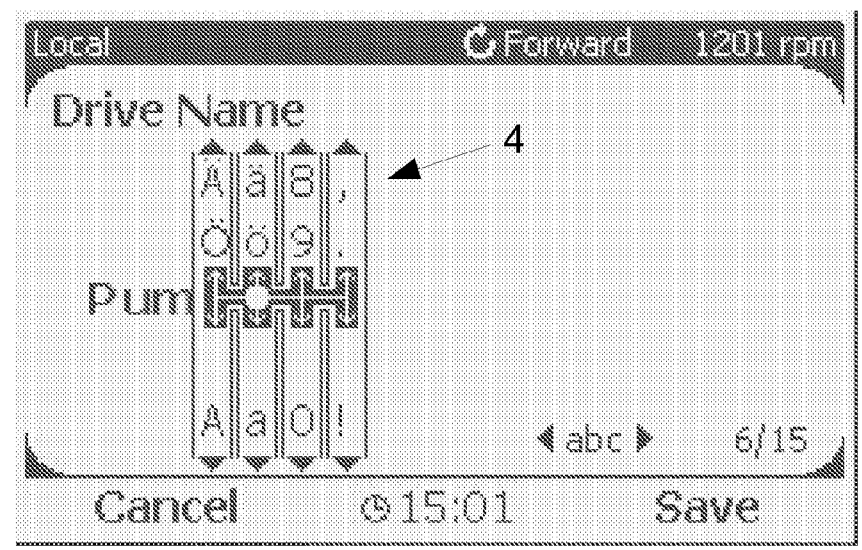
FIG. 3 presents an example of a display window in the frequency converter of FIG. 1.

FIG. 3 shows such a set of symbol lists 4 according to an exemplary embodiment of the present disclosure. In this view, the switch lists symbols 6 are represented by vertical horizontal arrows each with two arrowheads. The cursor is now represented by a point symbol that can be seen in the second symbol list 4 from the left.

In accordance with an exemplary embodiment, the symbol list 4 has been divided into at least two symbol lists 4, as shown in FIG. 3, for example. In the exemplary embodiment of FIG. 3, the number of symbol lists 4 is four, and in general can range from two to ten, for example. A practical selection for the number of symbol lists 4 might be between three and six, at least in some embodiments. As the number of symbol lists 4 is greater than one, each symbol list 4 becomes shorter and thereby it is faster to scroll any one of the symbol lists 4. Each of the symbol lists 4 is provided with a switch lists symbol 6 in order to allow switching from the current symbol list 4 to one of the other symbol lists 4. When the cursor 4 indicates one of the switch lists symbols 6, the left and right keys control the change of the symbol lists 4. When the cursor 4 indicates a symbol other than the switch lists symbol 6, the left and right keys control the input symbol string such that the right key selects the current symbol as an input (e.g., the next symbol of the symbol string 3), and the left key moves back along the input symbol string 3. In another exemplary embodiment, the left key, instead of moving back along the input symbol string 3, deletes the last symbol in the input symbol string 3.

As the symbol lists 4 can be kept practically short, the available symbol set can be extended to include more different symbols. This broadens the set of available symbols without compromising usability of the frequency converter.

In accordance with an exemplary embodiment, the symbols are divided into following lists: capital letters, small letters, numbers and special symbols. The set of available symbols can also be extended to include one or several of the following: Latin alphabets, Cyrillic alphabets, Greek alphabets, Hebrew alphabets, Chinese alphabets, Japanese alphabets and Korean alphabets.

As already stated above, the controller of the frequency converter can be configured such that the switch lists symbol 6 brings all the symbol lists 4 visible (see, e.g., FIG. 3) and moving the cursor 5 along the thus formed set of symbol lists 4. Alternatively, the symbol lists 4 can be scrolled laterally under the cursor 5 by pressing the left and right keys. The latter alternative can also display, in addition to the current symbol list 4, the adjacent symbol lists 4.

Figure 4:
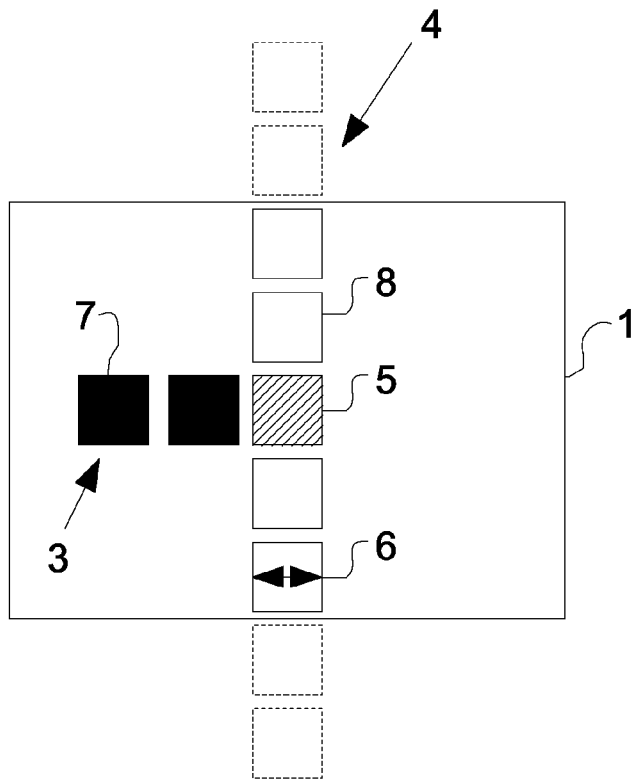
FIG. 4 is a schematic drawing an example of a display window according to an exemplary embodiment of the present disclosure.

FIG. 4 shows another exemplary embodiment of a display 1. In FIG. 4, black rectangles represent individual input symbols 7 that have already been selected and entered as part of the input symbol string 3. A hatched rectangle represents the cursor 5 and the current symbol that is indicated by the cursor 5. White rectangles represent other available symbols 8 in the symbol list 4 that are presently displayed. The rectangles shown in broken lines outside the display represent other available symbols in the symbol list 4 that are not presently displayed. FIG. 4 also shows one of the visible symbols being a switch lists symbol 6, in this case a two-headed arrow.

Figure 5:
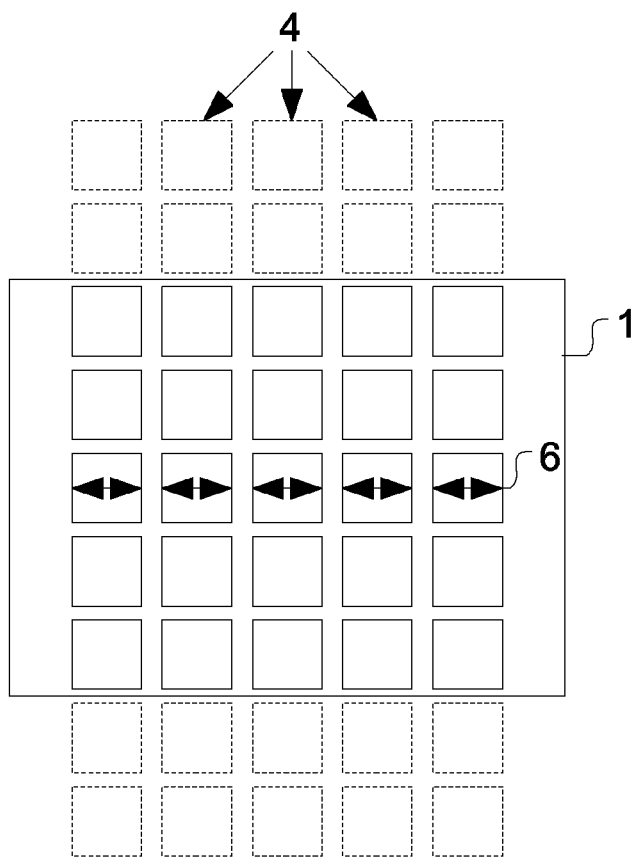
FIG. 5 is a schematic drawing of an example of a display window according to an exemplary embodiment of the present disclosure.

FIG. 5 shows the exemplary embodiment of FIG. 4 when the current symbol list 4 has been scrolled such that the cursor indicates the switch lists symbol 6. Then, all the symbol lists 4 are displayed in order to help the user in switching to a correct symbol list 4, if desired.

Figure 6:
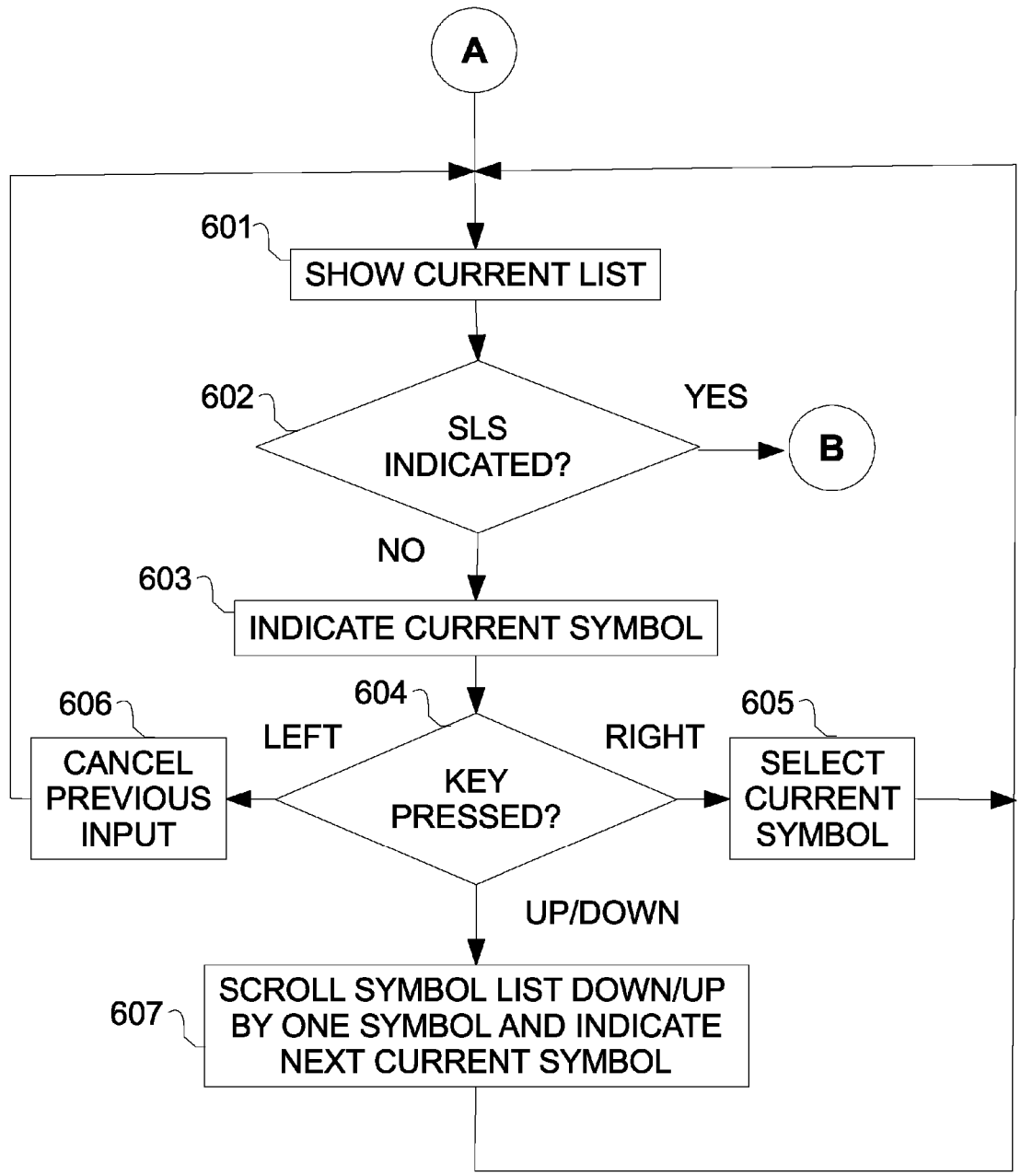
FIG. 6 is a first flow chart relating to the exemplary embodiments of FIGS. 4 and 5.
Figure 7:
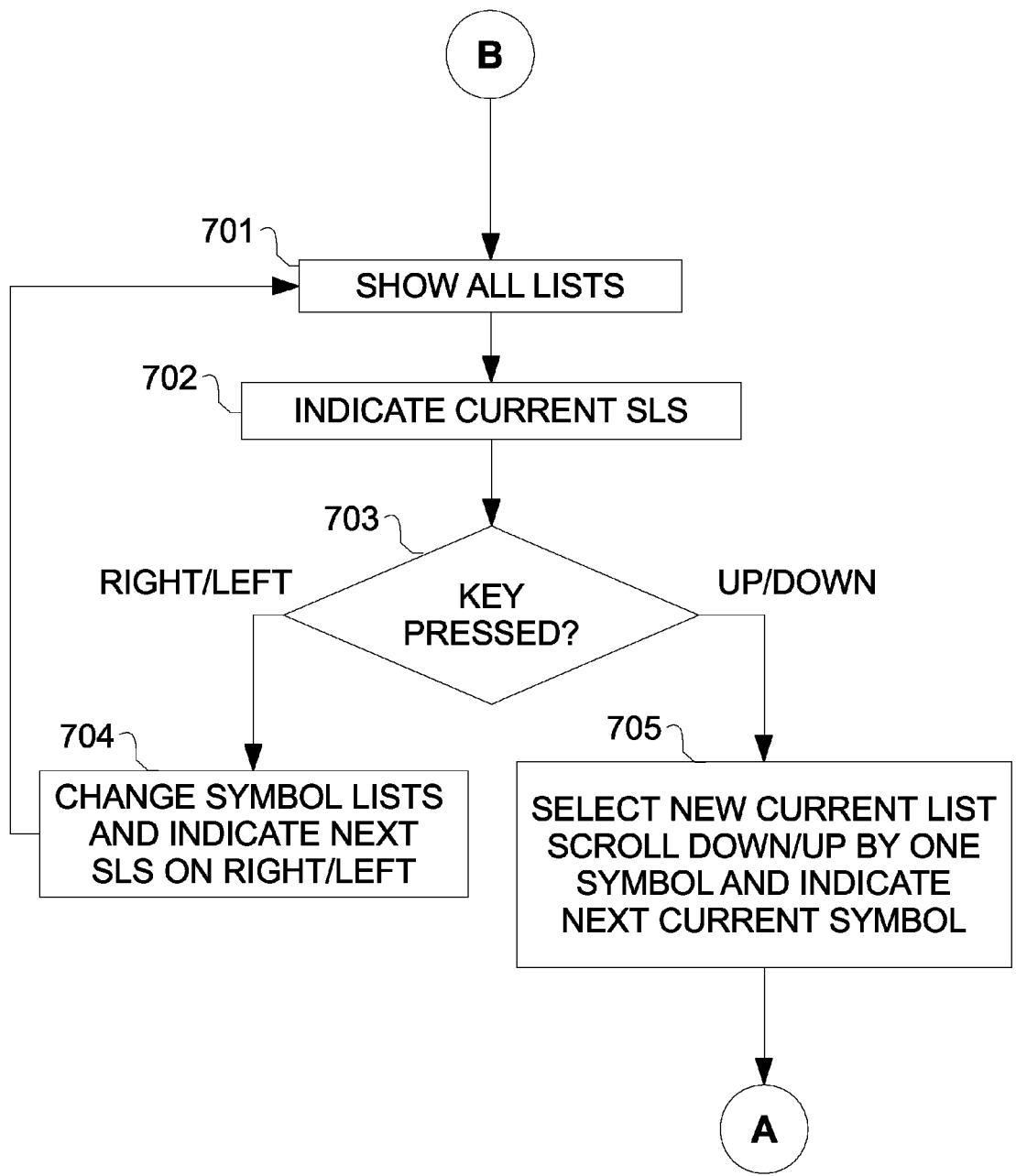
FIG. 7 is a second flow chart relating to the exemplary embodiments of FIGS. 4 and 5.

FIGS. 6 and 7 depict one possible flow chart relating to the exemplary embodiment of FIGS. 4 and 5. The process has come via point A to step 601, wherein the controller controls the display 1 to display the current symbol list 4. This can be the phase shown in FIG. 4. Next, the controller checks 602 whether the symbol indicated by the cursor 5 is the switch lists symbol 6 (SLS). If the answer is NO, the current symbol is indicated 603 by the cursor 5, and the controller waits for input from the four-directional control device. When a key is pressed, the controller selects 604 the response, for example, in a following way:

- Right key pressed: Select 605 the current symbol as the next symbol 7 in the input symbol string 3. Then, the process goes back to step 601 and shows again the current symbol list 4 and the input text string 3 in the updated situation.
- Left key pressed: Cancel 606 the previous selection, e.g., remove the last symbol 7 from in the input symbol string 3. Then, the process goes back to step 601 and shows again the current symbol list 4 and the input text string 3 in the updated situation.
- Up key pressed: Scroll 607 the current symbol list 4 downwards by one step so that the cursor 5 will be placed over the symbol that was displayed above the current symbol. Then, the process goes back to step 601 and shows the current symbol list 4 in the present, updated situation.
- Down key pressed: Scroll 607 the current symbol list 4 upwards by one step so that the cursor 5 will be placed over the symbol that was displayed under the current symbol. Then, the process goes back to step 601 and shows the current symbol list 4 in the present, updated situation.

If the controller finds in check 602 that the symbol indicated by the cursor 5 is the switch lists symbol 6 (SLS), the process continues at step 701 in FIG. 7. In this step, all the symbol lists 4, or in practice parts thereof, are displayed 701. The cursor indicates 702 the current switch lists symbol 6 (SLS) and the controller waits for input from the four-directional control device. When a key is pressed, the controller selects 703 the response, for example, in a following way:

- Right key pressed: Change the current symbol list, moving the cursor 5 one step rightwards. Then, go back to step 701 and show the updated situation with the new current SLS 702.
- Left key pressed: Change the current symbol list, moving the cursor 5 one step leftwards. Then, go back to step 701 and show the updated situation with the new current SLS 702.
- Up key pressed: Select 705 the new current list as the list that continues above the cursor 5. Scroll the new current symbol list 4 downwards by one step so that the cursor 5 will be placed over the symbol that was displayed above the switch lists symbol. Then, go back to step 601 in FIG. 6.
- Down key pressed: Select 705 the new current list as the list that continues under the cursor 5. Scroll the new current symbol list 4 upwards by one step so that the cursor 5 will be placed over the symbol that was displayed below the switch lists symbol. Then, go back to step 601 in FIG. 6.

In accordance with an exemplary embodiment, the controller of the frequency converter can include a processor configured to carry out the operative functions described herein. The processor can execute a program tangibly recorded on a non-transitory computer-readable recording medium, such as a ROM, hard disk drive, flash memory, as well as any other type of non-volatile memory. The processor can be a general purpose processor or an application specific processor.

An exemplary embodiment of the present disclosure provides a method for obtaining a symbol string 3 user input via a four-directional control device in a frequency converter. The exemplary method can include: (i) grouping the potential symbols 8 into at least two symbol lists 4; (ii) treating one of the symbol lists 4 as a current symbol list; (iii) displaying at least part of at least the current symbol list 4; (iv) displaying a cursor 5 indicating one of the symbols 8 in the current symbol list 4; (v) receiving commands via the four-directional control device; and (vi) based on the received commands, selectively changing the current symbol list to one of the other symbol lists 4, effecting relative movement between the cursor 5 and the current symbol list 4, and selecting the current symbol as the next symbol in the symbol string 3.

In accordance with an exemplary embodiment, the four-directional control device is configured to receive user inputs associated with a first direction, a second direction perpendicular to the first direction, a third direction opposite to the first direction, and a fourth direction opposite to the second direction. In this embodiment, the method can include: (a) providing each of the symbol lists 4 with a switch lists symbol 6; (b) receiving via the four-directional control device a user input associated with the first direction; (c) in response to the user input associated with the first direction, moving the current symbol list 4 in a third direction whereby the cursor 5 moves in the first direction relative to the current symbol list 4; (d) receiving via the four-directional control device a user input associated with the third direction; (e) in response to the user input associated with the third direction, moving the current symbol list 4 in a first direction whereby the cursor 5 moves in the third direction relative to the current symbol list 4; (f) receiving via the four-directional control device a user input associated with the second direction, when the cursor 5 indicates a symbol other than one of the switch lists symbols 6; (g) in response to the user input associated with the second direction, when the cursor 5 indicates a symbol other than one of the switch lists symbols 6, selecting the current symbol as the next symbol in the symbol string 3; (h) receiving via the four-directional control device a user input associated with the second direction or the fourth direction, when the cursor 5 indicates one of the switch lists symbols 6; and (i) in response to the user input associated with the second direction or the fourth direction, when the cursor 5 indicates one of the switch lists symbols 6, changing the symbol list 4 to one of the other symbol lists 4.

In accordance with an exemplary embodiment, the method can also include displaying at least part of each symbol list 4 when the cursor 5 indicates one of the switch lists symbols 6.

In accordance with an exemplary embodiment, the method can also include hiding other than the current symbol list 4 when the cursor 5 indicates a symbol other than one of the switch lists symbols 6. Then, only the current symbol list 4, or part thereof, is displayed. In addition to the current symbol list 4, other signs can also be displayed, such as the input symbol string, but the non-active symbol lists 4 are hidden and not visible.

In accordance with an exemplary embodiment, where each symbol list contains more than five symbols, the method can include simultaneously displaying only one to five symbols from any one symbol list 4. The rest of the symbol list 4 is hidden.

According to an embodiment, there is also provided a frequency converter configured to perform the above described methods.

An exemplary embodiment of the present disclosure also provides a frequency converter which includes a data structure including symbols grouped into at least two symbol lists 4, one of which is a current symbol list. The exemplary frequency converter also includes a display 1, which is configured to display at least part of at least the current symbol list 4 and a cursor 5 indicating one of the symbols, such as the current symbol. The exemplary frequency converter also includes a four-directional control device for receiving commands, and a controller configured to, based on the received commands, selectively effect the change of the current symbol list 4 to one of the other symbol lists 4, effect relative movement between the cursor 5 and the current symbol list 4, and select the current symbol as an input.

In accordance with an exemplary embodiment, the symbol lists are long relative to the size of the display 1 and the frequency converter is configured to display only a part of each symbol list at a time.

In accordance with an exemplary embodiment, each of the symbol lists contains a switch lists symbol 6, and the apparatus is configured to display all of the symbol lists 4, or parts thereof, when the cursor 5 is indicating the switch lists symbol 6.

In accordance with an exemplary embodiment, only the current symbol list 4, which contains the current symbol, is displayed when the cursor 5 indicates a symbol other than the switch lists symbol 6.

In accordance with an exemplary embodiment, the four-directional control device is configured to receive commands associated with a first, second, third and fourth directions.

In accordance with an exemplary embodiment, the controller is configured to effect relative movement between the cursor 5 and at least the current symbol list 4 in response to commands associated with the first and third directions.

In accordance with an exemplary embodiment, the controller 5 is configured to select the current symbol as an input in response to a command associated with the second direction.

In accordance with an exemplary embodiment, each of the symbol lists 4 contains a switch lists symbol 6 and the controller is configured to, when the cursor 5 indicates one of the switch lists symbols 6, effect the change of the current symbol list 4 to one of the other symbol lists 4 in response to commands associated with the second and fourth directions.

In accordance with an exemplary embodiment, the four-directional control device comprises four keys 2, each configured for receiving an individual one of the commands associated with the first, second, third and fourth directions.

In accordance with an exemplary embodiment, the first, second, third and fourth directions are respectively up, right, down and left.

As is apparent from the above description, the exemplary embodiments of the present disclosure provide several advantageous aspects. For example:
- the entering and selecting the input symbols is efficient as the number of necessary steps when moving along the lists remains relatively low even when the number of available symbols is great;
- the symbols do not need a large display to be shown to the user; and
- editing is possible by using as little as four keys (or a corresponding four-directional control device).

The possibility to edit symbol strings by using only four keys is very practical as this editor can be very conveniently integrated with a so-called Daisy panel. This panel includes four arrow keys (up, right, down and left) that are used to enter numbers, such as parameter values, dates and times. Then, the same soft keys (e.g., Cancel and Save) can be used in a corresponding way also when using the text editor. This coherency enhances usability and simplifies the technical realization of the frequency converter.

The above description is only to exemplify the disclosure and is not intended to limit the scope of protection offered by the claims. The claims are also intended to cover the equivalents thereof and not to be construed literally.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for obtaining a symbol string user input via a four-directional control device in a frequency converter, wherein the four-directional control device is configured to receive user inputs associated with a first direction, a second direction perpendicular to the first direction, a third direction opposite to the first direction, and a fourth direction opposite to the second direction, the method comprising:
   grouping potential symbols into at least two symbol lists;
   treating one of the symbol lists as a current symbol list;
   displaying at least part of at least the current symbol list;
   displaying a cursor indicating one of the symbols in the current symbol list as a current symbol;
   receiving commands via the four-directional control device;
   based on the received commands, selectively changing the current symbol list to one of the other symbol lists, effecting relative movement between the cursor and the current symbol list, and selecting the current symbol as the next symbol in the symbol string;
   providing each of the symbol lists with a switch lists symbol;
   receiving via the four-directional control device a user input associated with the first direction;
   in response to receiving the user input associated with the first direction, moving the current symbol list in the third direction such that the cursor moves in the first direction relative to the current symbol list;
   receiving via the four-directional control device a user input associated with the third direction;
   in response to receiving the user input associated with the third direction, moving the current symbol list in the first direction such that the cursor moves in the third direction relative to the current symbol list;
   receiving via the four-directional control device a user input associated with the second direction, when the cursor indicates a symbol other than one of the switch lists symbols;
   in response to receiving the user input associated with the second direction, when the cursor indicates a symbol other than one of the switch lists symbols, selecting the current symbol as the next symbol in the symbol string;
   receiving via the four-directional control device a user input associated with one of the second direction and the fourth direction, when the cursor indicates one of the switch lists symbols; and
   in response to receiving the user input associated with the one of the second direction and the fourth direction, when the cursor indicates one of the switch lists symbols, changing the symbol list to one of the other symbol lists.

2. The method of claim 1, comprising:
   displaying at least part of each symbol list when the cursor indicates one of the switch lists symbols.

3. The method of claim 1, comprising:
hiding other than the current symbol list when the cursor indicates a symbol other than one of the switch lists symbols.

4. The method of claim 1, wherein each symbol list contains more than five symbols, and
wherein the method comprises simultaneously displaying only one to five symbols from any one symbol list.

5. A frequency converter comprising:
a data structure including symbols grouped into at least two symbol lists, one of which is a current symbol list;
a display configured to display at least part of at least the current symbol list and a cursor indicating one of the symbols as a current symbol; and
a four-directional control device configured to receive commands; and
a controller configured to, based on the received commands, selectively effect the change of the current symbol list to one of the other symbol lists, effect relative movement between the cursor and the current symbol list, and select the current symbol as an input, wherein:
the four-directional control device is configured to receive user inputs associated with a first direction, a second direction perpendicular to the first direction, a third direction opposite to the first direction, and a fourth direction opposite to the second direction;
each of the symbol lists is provided with a switch lists symbol;
the four-directional control device is configured to receive a user input associated with the first direction;
the controller is configured to, in response to the four-directional control device receiving the user input associated with the first direction, effect movement of the current symbol list in the third direction such that the cursor moves in the first direction relative to the current symbol list;
the four-directional control device is configured to receive a user input associated with the third direction;
the controller is configured to, in response to the four-directional control device receiving the user input associated with the third direction, effect movement of the current symbol list in the first direction such that the cursor moves in the third direction relative to the current symbol list;
the four-directional control device is configured to receive a user input associated with the second direction, when the cursor indicates a symbol other than one of the switch lists symbols;
the controller is configured to, in response to the four-directional control device receiving the user input associated with the second direction, when the cursor indicates a symbol other than one of the switch lists symbols, effect selection of the current symbol as the next symbol in the symbol string;
the four-directional control device is configured to receive a user input associated with one of the second direction and the fourth direction, when the cursor indicates one of the switch lists symbols; and
the controller is configured to, in response to the four-directional control device receiving the user input associated with the one of the second direction and the fourth direction, when the cursor indicates one of the switch lists symbols, effect changing of the symbol list to one of the other symbol lists.

6. The frequency converter of claim 5, wherein the symbol lists are long relative to a size of the display, and only a part of each symbol list is displayed at a time.

7. The frequency converter of claim 5, wherein each of the symbol lists contains a switch lists symbol, and the display is configured to display at least parts of the symbol lists when the cursor is indicating the switch lists symbol.

8. The frequency converter of claim 7, wherein all of the symbol lists are displayed when the cursor is indicating the switch lists symbol.

9. The frequency converter of claim 7, wherein the display is configured to display only the current symbol list, which contains the current symbol, when the cursor indicates a symbol other than the switch lists symbol.

10. The frequency converter of claim 5, wherein the four-directional control device is configured to receive commands associated with a first, second, third and fourth directions.

11. The frequency converter of claim 10, wherein the controller is configured to effect relative movement between the cursor and at least the current symbol list in response to commands associated with the first and third directions.

12. The frequency converter of claim 11, wherein the controller is configured to select the current symbol as an input in response to a command associated with the second direction.

13. The frequency converter of claim 10, wherein the controller is configured to select the current symbol as an input in response to a command associated with the second direction.

14. The frequency converter of claim 10, wherein each of the symbol lists contains a switch lists symbol, and
wherein the controller is configured to, when the cursor indicates one of the switch lists symbols, effect the change of the current symbol list to one of the other symbol lists in response to commands associated with the second and fourth directions.

15. The frequency converter of claim 10, wherein the four-directional control device comprises four keys, each configured to receive an individual one of the commands associated with the first, second, third and fourth directions, respectively.

16. A frequency converter comprising:
a data structure including symbols grouped into at least two symbol lists, one of which is a current symbol list, each of the symbol lists containing a switch lists symbol;
a display configured to display at least part of at least the current symbol list and a cursor indicating one of the symbols as a current symbol;
a four-directional control device configured to receive commands, the four-directional control device being configured to receive commands associated with a first, second, third and fourth directions; and
a controller configured to, based on the received commands, selectively effect the change of the current symbol list to one of the other symbol lists, effect relative movement between the cursor and the current symbol list, and select the current symbol as an input, wherein:
the controller is configured to effect the change of the current symbol list to one of the other symbol lists in response to commands received when the cursor indicates one of the switch lists symbols and associated with at least one of the directions;
the second direction is perpendicular to the first direction, the third direction is opposite to the first direction, and the fourth direction is opposite to the second direction;
the controller is responsive to a user input associated with the first direction to move the current symbol list in the third direction such that the cursor moves in the first direction relative to the current symbol list;
the controller is responsive to a user input associated with the third direction to move the current symbol list in the first direction such that the cursor moves in the third direction relative to the current symbol list;

when the cursor indicates a symbol other than one of the switch lists symbols, the controller is responsive to a user input associated with the second direction to select the current symbol as the next symbol in the symbol string; and when the cursor indicates one of the switch lists symbols, the controller is responsive to a user input associated with the second direction or the fourth direction to change the symbol list to one of the other symbol lists.

17. The frequency converter of claim 16, wherein the controller is configured to effect relative movement between the cursor and at least the current symbol list in response to commands associated with the first and third directions.

18. The frequency converter of claim 16, wherein the controller is configured to select the current symbol as an input in response to a command associated with the second direction.

19. The frequency converter of claim 16, wherein the controller is configured to, when the cursor indicates one of the switch lists symbols, effect the change of the current symbol list to one of the other symbol lists in response to commands associated with the second and fourth directions.

20. The frequency converter of claim 16, wherein the four-directional control device includes four keys, each configured to receive an individual one of the commands associated with the first, second, third and fourth directions, respectively.

21. A non-transitory computer-readable recording medium having a program recorded thereon that causes a processor of a frequency converter, which is configured to receive user inputs associated with a first direction, a second direction perpendicular to the first direction, a third direction opposite to the first direction, and a fourth direction opposite to the second direction, to execute operations comprising:

grouping potential symbols into at least two symbol lists;
treating one of the symbol lists as a current symbol list;
displaying at least part of at least the current symbol list;
displaying a cursor indicating one of the symbols in the current symbol list as a current symbol;
receiving commands via the four-directional control device;
based on the received commands, selectively changing the current symbol list to one of the other symbol lists, effecting relative movement between the cursor and the current symbol list, and selecting the current symbol as the next symbol in the symbol string;
providing each of the symbol lists with a switch lists symbol;
receiving via the four-directional control device a user input associated with the first direction;
in response to receiving the user input associated with the first direction, moving the current symbol list in the third direction such that the cursor moves in the first direction relative to the current symbol list;
receiving via the four-directional control device a user input associated with the third direction;
in response to receiving the user input associated with the third direction, moving the current symbol list in the first direction such that the cursor moves in the third direction relative to the current symbol list;
receiving via the four-directional control device a user input associated with the second direction, when the cursor indicates a symbol other than one of the switch lists symbols;
in response to receiving the user input associated with the second direction, when the cursor indicates a symbol other than one of the switch lists symbols, selecting the current symbol as the next symbol in the symbol string;
receiving via the four-directional control device a user input associated with one of the second direction and the fourth direction, when the cursor indicates one of the switch lists symbols; and
in response to receiving the user input associated with the one of the second direction and the fourth direction, when the cursor indicates one of the switch lists symbols, changing the symbol list to one of the other symbol lists.

\* \* \* \* \*